April 5, 1960
W. F. HUCK
2,931,962
MEASUREMENT AND CONTROL OF WEB TENSION
Filed Oct. 18, 1957
2 Sheets-Sheet 1
*Fig. 1*
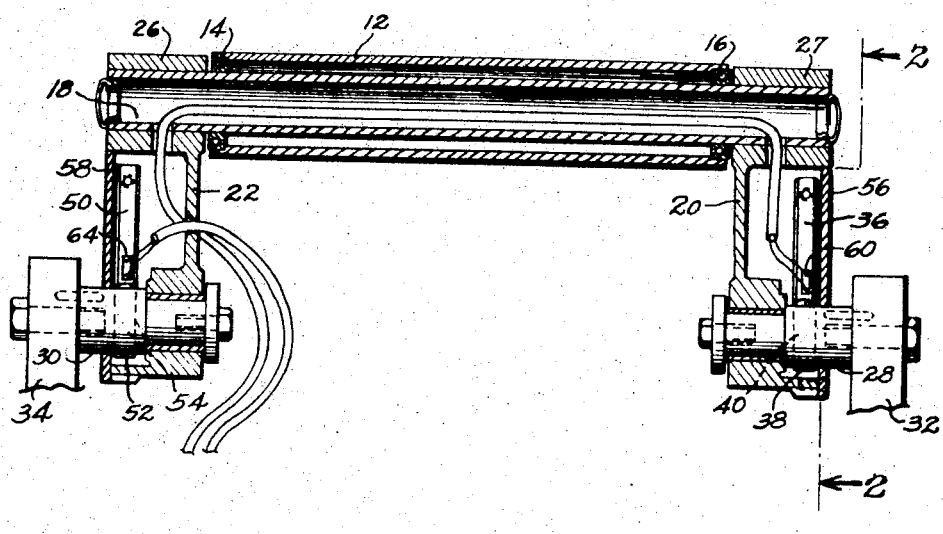
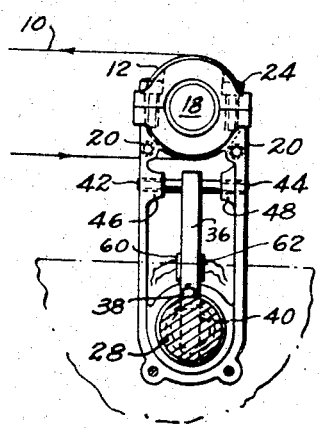
*Fig. 2*
INVENTOR:
WILLIAM F. HUCK
BY Homer R. Montague
ATTORNEY April 5, 1960  W. F. HUCK  2,931,962
MEASUREMENT AND CONTROL OF WEB TENSION
Filed Oct. 18, 1957  2 Sheets-Sheet 2

INVENTOR:
WILLIAM F. HUCK,
BY Homer R Montague
ATTORNEY

United States Patent Office 2,931,962
Patented Apr. 5, 1960

2,931,962

MEASUREMENT AND CONTROL OF WEB TENSION

William F. Huck, Forest Hills, N.Y., assignor to Huck Company, New York, N.Y., a New York partnership Application October 18, 1957, Serial No. 691,092

6 Claims. (Cl. 318—6)

This invention relates in general to tension measuring and control apparatus, and more particularly to means for measuring, indicating, adjusting and automatically controlling the tension in a moving web, strand or the like.

In the paper and cloth processing arts, as well as in the printing art, where continuous lengths of web are directed through various operations, it is very important that the tension of the web be kept within close limits, and that some means be provided for continuously indicating the web tension as well as for quickly adjusting the web tension if such limits are exceeded.

Many of the prior art devices for measuring web or strand tension are of the mechanical variety, in that they utilize spring biased rollers urged against the moving web to indicate tension at the point of measurement. It is an object of this invention to provide a web tension indicator that is electrically operated and which indicates the tension of the web at any desired distance from the point of measurement.

It is another object of this invention to provide a web tension measuring, indicating and controlling device which does not affect the length of the web path as the tension is being continuously measured and adjusted.

It is another object of this invention to provide a web tension measuring and indicating device which will operate accurately regardless of the width of the web being measured, or the relative sidewise position of the web in the machine.

It is still another object of this invention to provide an electrical device for measuring, controlling and indicating web tension which is capable of being calibrated easily and rapidly, to maintain the indications within a predetermined nominal or desired range.

It is another object of this invention to provide a remote reading electrically operated web tension measuring and indicating device combined with a device for adjusting the web tension in accordance with such indications.

The foregoing, as well as other objects and advantages of the invention, will become more readily apparent when the following specification is read in conjunction with the attached drawings of certain preferred embodiments of the invention, and in which drawings:

Figure 1 is a view in elevation, partly in vertical section, of the strain gage elements and web supporting roller structure utilized in this invention.

Figure 2 is a sectional view taken on the broken line 2—2 of Figure 1.

Figure 3:
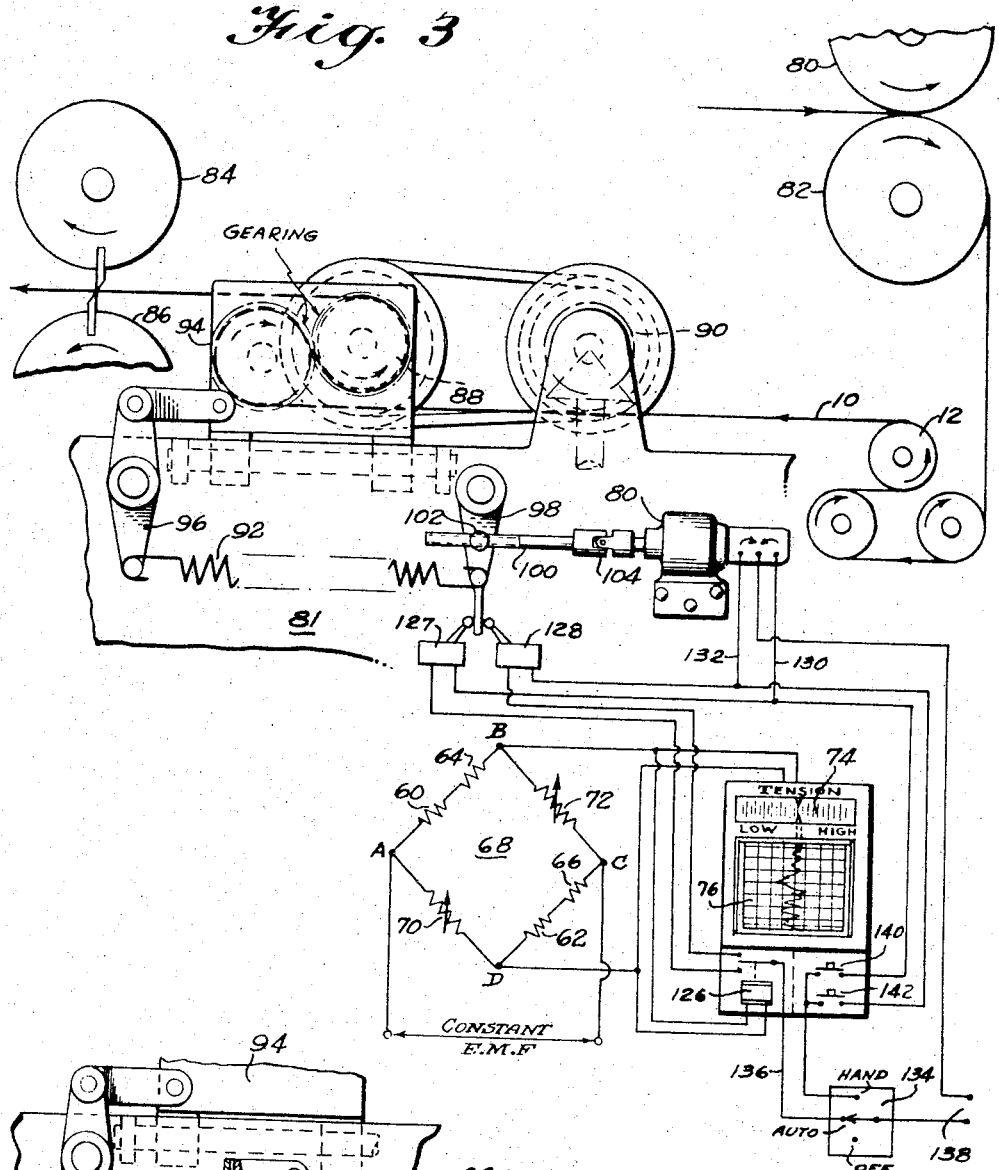
Figure 3 is an elevational view of a tension adjusting mechanism in combination with the web tension measuring, controlling and indicating means, shown partly in a schematic circuit diagram.

While the preferred embodiment of this invention will be described in use with a printing machine, the invention can be utilized with other machines performing various operations upon a continuous web, or even strands, of cloth, metal, paper or the like, in which it is desired to measure, indicate, and maintain the web tension within certain predetermined values.

Referring now to the drawings, and to Figures 1 and 2 particularly, reference numeral 10 indicates a continuous web of cloth, paper or the like, which it is desired to keep at a certain tension within predetermined limits. The web 10 is passed around an idler roller 12 rotatably mounted by means of bearings 14 and 16 on a tubular shaft 18. Both ends of the tubular shaft 18 are firmly clamped to arms 20 and 22 by bolts 24 inserted in the caps 26 and 27.

The tubular shaft 18 is so proportioned as to provide a torsionally rigid mounting between the arms 20 and 22. The lower ends of arms 20 and 22 are pivotally mounted on respective studs 28 and 30. The studs 28 and 30 are securely bolted to frame members 32 and 34, respectively, of the printing press through which the web 10 is to be guided.

An elongated flat metallic member 36, hereinafter referred to as a strain member, is provided with a rounded shank 38 at its lower end which is securely fitted into an opening 40 in the stud 28. The end of the flat portion of the strain member 36 is held rigidly between two screws 42 and 44 extending from mounts 46 and 48 on the arm 20, as shown clearly in Figure 2, so that the member will be flexed whenever arm 20 rotates in response to bodily movement of roller 12, caused by a change in the web tension.

The other arm 22, which also supports the tubular shaft 18, is provided with a strain member 50 which is identical in all respects to the strain member 36. The strain member 50 is also provided with a rounded end 52 which is securely fitted into an opening 54 in the stud 30. The flat upper portion of the strain member 50 is held rigidly between two screws (not shown) extending from mounts (not shown) on the arm 22. Although these strain member holding screws are not shown, they are identical to and mounted in the same manner as those described for the strain member 36. Covers 56 and 58 are fastened to the arms 20 and 22, respectively, to provide protection against dust and dirt for the strain members 36 and 50.

Each strain member 36 and 50 is provided with two strain gage elements, one on each flat face of the member. As seen in Figure 2, the strain member 36 is provided with the strain gage elements 60 and 62, while the strain member 50 is provided with the strain gage elements 64 and 66, one lying behind the other in Figure 1. The strain gage elements are suitably bonded to their respective strain members, so as to be influenced by the forces generated when the members are flexed.

The strain gage elements 60, 62, 64, and 66 are identical and are preferably of the type which vary in electrical resistance as they are subjected to more or less strain. This type of element is well known and requires no further description herein. The strain gage elements 60, 62, 64 and 66 are connected by suitable conductors into a Wheatstone bridge circuit 68 (see Figures 3), having legs AB, BC, CD, and AD. The strain gage elements 60 and 64, each located on the same side of the strain members 36 and 50 respectively, are connected in series in the leg AB of the Wheatstone bridge 68 (see Figure 3). The strain elements 62 and 66 are located on the opposite sides of strain members 36 and 50 from the elements 60 and 64 respectively, and are series connected in the leg CD of the Wheatstone bridge 68. The leg AD of the bridge 68 is provided with a variable resistance 70, and the leg BC is provided with a variable resistance 72, for balancing and calibrating purposes.

The indicating and controlling devices are located on one side of the press outside the frames. Hence the electrical wires from strain gages 60 and 62 are brought through tubular shaft 18 as shown in Figure 1.

It will be seen in Figure 2 that the web 10 exerts a force on the idler roller 12 which is counterclockwise in direction. As a result of this force the strain members 36 and 50 will be subjected to compression on the side where strain elements 60 and 64 are located. This compressive force causes a lowering of the electrical resistance of the elements 60 and 64. Conversely, the other side of each of the strain members 36 and 50 will be subjected to a tensile force causing the strain elements 62 and 66 to be stretched or expanded, resulting in an increase of electrical resistance of the elements 62 and 66. This variation in electrical resistance of the strain elements 60, 62 64 and 66 is in proportion to the strain to which the strain members 36 and 50 are subjected, which is, in turn, proportional to the force acting on the idler roller 12 due to the tension of the web 10. Thus the electrical resistance of the strain elements 62 and 66 is in direct proportion to the web tension, and the electrical resistance of the strain gage elements 60 and 64 varies inversely with the tension of the web 10. Since the strain elements 60 and 64 which are subjected to a compressive force are connected in series, their total effect will also be inversely proportional to the web tension. Similarly, the strain elements 62 and 66 are also connected in series, and being subject to a tensile force, their total effect will be directly proportional to the web tension.

When the web 10 extends for example only half way across roller 12 from arm 22, web tension variations tend to affect strain elements at one end of the roller more than those at the other end. The torsionally rigid tube 18 will tend to equalize this somewhat. However, since the strain elements undergoing compression (60 and 64) and those undergoing tension (62 and 66) are connected in series, their total effect will still be proportional to web tension. Hence, this arrangement operates properly regardless of web width or side-to-side location.

The output from points B and D of the Wheatstone bridge 68 will be zero when the resistance of legs B—A—D equals the resistance of legs B–C–D. An increase in tension of the web 10 will create an increase in the resistance of the strain elements 62 and 66, while causing a decrease in the resistance of strain elements 60 and 64, so that the voltage between points B and D of the bridge 68 becomes different from zero, which output may be measured and indicated by voltmeter 74, the indication or deflection being in proportion to the tension of the web 10. The voltmeter 74 may be located at any desired position relative to the point of measurement on the strain members 36 and 50.

The web tension indicating meter 74 may be calibrated by the variable resistances 70 and 72 of the Wheatstone bridge 68, to indicate deviation from any desired or standard condition of web tension. A constant direct-current potential is applied to the points A and C of the bridge 68 in the customary manner. To provide a permanent record of the web tension during the complete run of a web through the printing press, an electrical graph-type of recorder 76 may be located in the same housing as the indicating meter 74. The recorder may be used to record variations in web tension for periods of time as long as several weeks, if so desired.

The web tension measuring, indicating and recording means just described is utilized in combination with a web tension control means. The web tension control means may be of the general type described in the U.S. patent of W. F. Huck, No. 2,787,463. As shown in Figure 3 of the drawings, both the web tension indicator and a tension control mechanism are located between printing cylinders 80 and 82 and web cutting cylinders 84, 86 of the printing press. In this type of printing operation it is important that the length of the web between the printing cylinders 80, 82 and the cutting cylinders 84, 86 remain constant within very close limits under varying web tensions.

The web tension indicator 74 and the recorder 76, as well as the control mechanism may, in the case of printing press operation, be located at the folding mechanism where the press operators are usually stationed. With this arrangement the press operator may keep close watch of the web tension as indicated on 74, and may alter the web tension when necessary by means of the control which acts to energize a reversible motor 80 mounted upon the frame 81 of the web tension adjustment mechanism. As stated above, the web tension adjusting means may be of the type disclosed in the aforementioned Huck patent, in which a pair of gear connected rollers over which the web passes are adjustably mounted for lateral movement relative to frames 81. In Figure 3, these laterally floating web rollers 88 carrying the web are kept in proper relationship to fixed rollers of the machine by a spring 92, one end of which is connected through a pivoted linkage 96 to a movable support 94 carrying rollers 88, the other end being secured to a pivoted linkage 98 mounted upon the frame of the web tension adjusting device. The spring 92 may be placed under more or less tension by means of a threaded rod 100 passing through a threaded fitting 102 mounted upon the pivot link 98. The threaded rod 100 is connected by means of a universal joint 104 to the reversible motor 80. By control of the motor 80, the operator may lengthen or shorten the spring 92 and thus adjust the equilibrium position of rolls 88 which are driven by a precisely controllable variable speed drive from pulley 90, as described in the Huck patent mentioned above. The mode of operation of this web tension adjustment device, as such, is fully disclosed in that patent.

Figure 4:
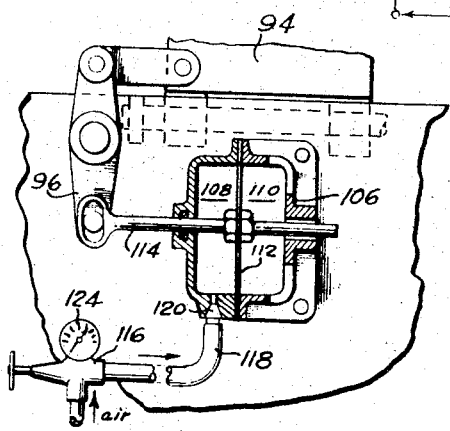
Figure 4 is a view partly in section of an alternative means for actuating the web tension adjustment device illustrated in Figure 3.

An alternate means for adjusting the web tension is illustrated in Figure 4. In this modification, instead of the spring 92 and its length adjustment means as shown in Figure 3, the lower arm of the pivoted link 96 is actuated by a pneumatic means. A pressure chamber 106 is divided into two parts 108 and 110 by means of a flexible diaphragm 112 having a piston rod 114 secured thereto by clamp nuts and connected to the lower portion of the pivoted link 96. Air under pressure is fed to the air chamber through a control valve 116, conduit 118 and fitting 120 into tne air chamber portion 108. An air pressure meter 124 may be calibrated to coincide with the scale provided on the meter 74 (Figure 3) to indicate web tension directly. By adjusting the air pressure in the chamber 108 by means of control valve 116, the diaphragm rod 114 acting through the pivoted link 96 will shift the roller carriage 94, and the position of roller 88 will again change, thus changing the web tension the desired amount. The pressure control valve 116, as also indicator 74 and the control switches for motor 80, may be located at any point near to or remote from the tension adjustment mechanism.

The control adjustment of web tension by reversible motor 80 lends itself particularly well to an automatic regulation of the web tension, especially since the tension measurement by electrical means provides directly a suitable output for such automatic operation. Figure 3 of the drawings shows such a system in schematic form, and adapted both to automatic web tension regulation in a manner to be described, as well as to an over-riding manual tension adjustment. The latter is particularly useful when the web handling machine is being brought up initially to its normal running speed, or for shutting down the machine, or making a change in its running speed.

As already described, the output terminals of the bridge 68 are connected to the indicating and/or recording voltmeter 74, 76, calibrated for example in terms of web tension units. The same terminals are also connected to the coil of a differential (polarized) relay 126, whose movable contact will "float" or remain out of contact with either of the fixed contacts, so long as the bridge is substantially balanced; that is, when its output voltage is within a certain small range. When the bridge is unbalanced in one direction or the other by more than a certain amount, one or the other of the relay contacts will be engaged to energize, through the appropriate limit switch 127, 128, a motor conductor 130 or 132, to drive the motor 80 in the appropriate direction to change the position of link 98 and alter the web speed in the direction to rebalance the bridge. The limit switches prevent overcorrection such as might occur if the delay in the rebalancing loop is substantial.

The above action will occur more or less continuously when the master control switch 134 is set, as shown, in the "automatic" position, in which conductor 136 is energized from the A. C. supply line at 138. When this switch is set in the "hand" position, the automatic feature is discontinued and pushbuttons 140 and 142 enable the operator to exercise manual control of the direction of motor 80, for example when the machine is being brought up to speed. Pushbutton 140, for example, will drive motor 80 in the direction to increase the web tension, and the other pushbutton 142 will operate to reduce the tension. The operator can thus exercise close supervision, by observing and even anticipating the position of indicating meter 74.

Although the preferred embodiment of this invention has been described as being utilized in a printing machine, it is obvious that the invention may be utilized to measure, indicate and control web or strand tension in other machines and arts where various operations are to be performed upon a continuous web or strand of paper, cloth, metal or the like. In addition, types of strain gage elements or transducers may be utilized which vary under stress in some electrical characteristic other than resistance. Other modifications in detail will occur readily to those skilled in the art, and such are not to be deemed excluded from the spirit of this invention if they fall within the scope of the appended claims.

What is claimed is:

1. Apparatus for sensing tension in a moving web or the like, comprising an idler roller around which passes such moving web, an axle for said roller, a frame member, means for mounting said axle on said frame member for rotation about an axis spaced from but substantially parallel to said axle upon the occurrence of a change in the tension of such web, a flexure member mounted on said frame member and having a portion thereof lying in the path of such rotational motion of said mounting means whereby said flexure member is flexed by an amount which is proportional to the amount of such rotational motion, and an electrical strain gauge mounted on said flexure member for providing an electrical signal corresponding in amplitude to the amount of such rotational motion.

2. Apparatus for sensing tension in a moving web or the like in accordance with claim 1, wherein said idler roller is mounted for rotation about said axle.

3. Apparatus for sensing tension in a moving web or the like in accordance with claim 1, and including a second electrical strain gauge mounted on a face of said flexure member opposite to that on which said first-mentioned electrical strain gauge is mounted, an electrical bridge circuit including the respective strain gauges in opposite legs thereof, a source of voltage applied across one diagonal of said bridge, and an indicating means connected across the remaining diagonal of said bridge, whereby the complementary outputs of said electrical strain gauges are algebraically combined in said bridge circuit to enhance the operation thereof.

4. Apparatus for sensing and controlling the tension in a moving web or the like, comprising an idler roller around which passes such moving web, an axle for said roller, a frame member, means for mounting said axle on said frame member for rotation about an axis spaced from but substantially parallel to said axle upon the occurrence of a change in tension of such web, a flexure member mounted on said frame member and having a portion thereof lying in the path of such rotational motion of said mounting means whereby said flexure member is flexed by an amount which is proportional to the amount of such rotational motion, a first electrical strain gauge mounted on one face of said flexure member, a second electrical strain gauge mounted on an opposite face of said flexure member whereby the electrical signals obtained from said first and second strain gauges are complementary in nature, an electrical bridge circuit including the respective strain gauges in opposite legs thereof, a source of voltage applied across one diagonal of said bridge, an electric motor having a winding thereof connected across the other diagonal of said bridge, and means connected to and driven by said motor for changing the tension in such web upon the energization of such motor in response to an unbalance of said bridge under the control of said strain gauges.

5. Apparatus for sensing tension in a moving web or the like, comprising an idler roller around which passes such moving web, an axle for said roller, means mounting said roller for rotation about said axle, a frame member, a pair of arms for mounting said axle on said frame member for rotation about an axis spaced from but substantially parallel to said axle upon the occurrence of a change in tension in such web, a flexure member associated with each of said arms and mounted on said frame member with a portion of each of said flexure member lying in the path of rotational motion of a respective one of said mounting arms whereby each of said flexure members is flexed by an amount which is proportional to the amount of such rotational motion, said mounting arms being securely attached to said axle near opposite ends thereof whereby said arms are constrained to move in unison, electrical strain gauges mounted on opposing faces of each of said flexure means, the strain gauges mounted on similarly disposed faces of the respective flexure members being connected in series with each other, an electrical bridge circuit including such series combinations of said strain gauges in opposite legs thereof, a source of voltage connected across one diagonal of said bridge circuit, and an indicating means connected across the remaining diagonal of said bridge circuit, whereby the complementary outputs of said electrical strain gauges are algebraically combined in said bridge circuit to enhance the operation thereof.

6. Apparatus for sensing and controlling tension in a moving web or the like, comprising an idler roller around which passes such moving web, an axle for said roller, means mounting said roller for rotation about said axle, a frame member, a pair of arms for mounting said axle on said frame member for rotation about an axis spaced from but substantially parallel to said axle upon the occurrence of a change in tension in such web, a flexure member associated with each of said arms and mounted on said frame member with a portion of each of said flexure members in the path of rotational motion of a respective one of said mounting arms whereby each of said flexure members is flexed by an amount which is proportional to the amount of such rotational motion, said mounting arms being securely attached to said axle near opposite ends thereof whereby said arms are constrained to move in unison, electrical strain gauges mounted on opposing faces of each of said flexure members, the strain gauges mounted on similarly disposed faces of the respective flexure members being connected in series with each other, an electrical bridge circuit including such series combinations of said strain gauges in opposite legs thereof, a source of voltage connected across one diagonal of said bridge circuit, an electrical motor having a winding thereof connected across the remaining diagonal of said bridge, and means connected to and driven by said electrical motor for changing the tension in such web upon the energization of such motor in response to an unbalance of said bridge under the control of said strain gauges.

References Cited in the file of this patent

UNITED STATES PATENTS

| | | |
|---|---|---|
| 2,389,382 | Mikina | Nov. 20, 1945 |
| 2,787,463 | Huck | Apr. 2, 1957 |